Jan. 29, 1974  A. J. MISENTI ET AL  3,788,943

AUTOMATIC CONTROL ROD LATCHING DEVICE

Filed Dec. 19, 1969  2 Sheets-Sheet 1

INVENTORS
ANGELO J. MISENTI
GENNARO V. NOTARI

BY Harris
ATTORNEY

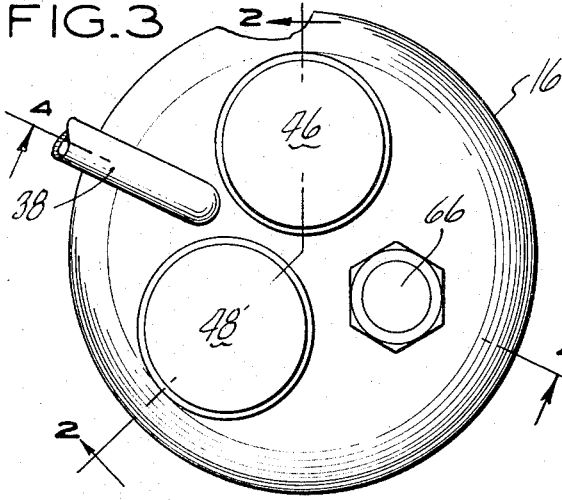
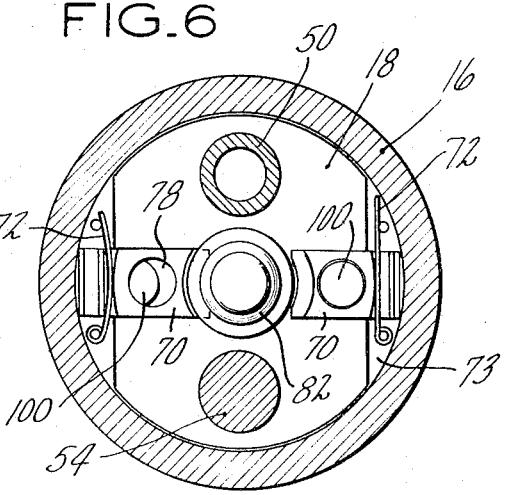
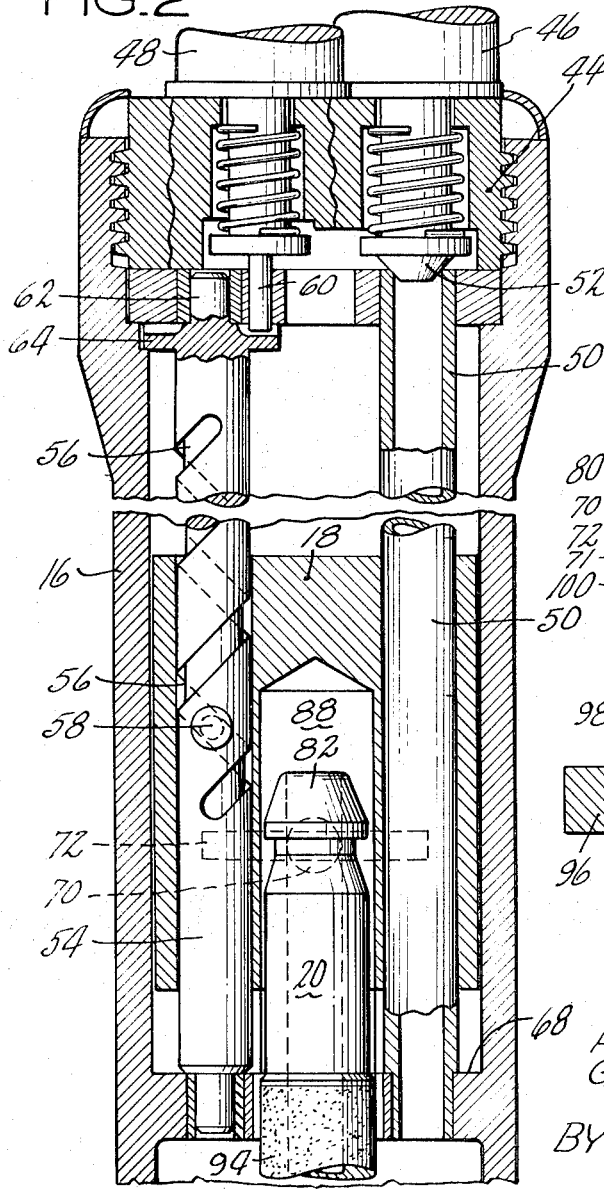
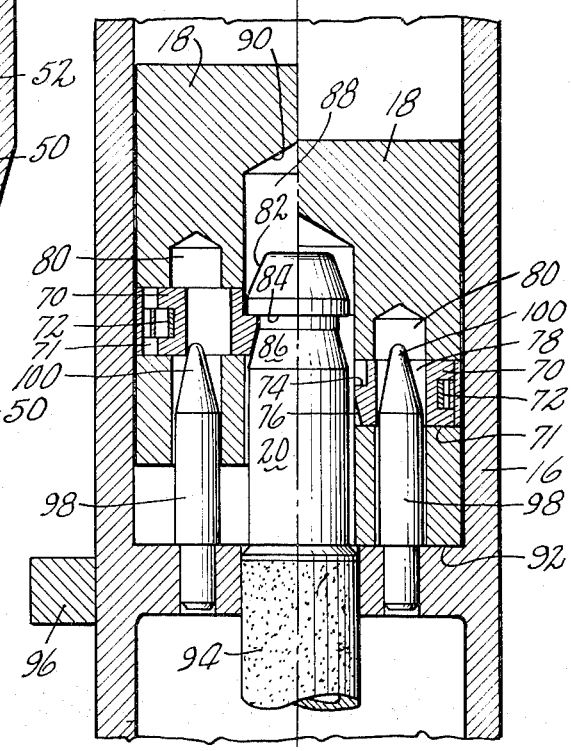

United States Patent Office 3,788,943
Patented Jan. 29, 1974

3,788,943
AUTOMATIC CONTROL ROD LATCHING DEVICE
Angelo J. Misenti and Gennaro V. Notari, Simsbury, Conn., assignors to Combustion Engineering, Inc., Windsor, Conn.
Filed Dec. 19, 1969, Ser. No. 886,574
Int. Cl. G21c 7/00
U.S. Cl. 176—35       12 Claims

ABSTRACT OF THE DISCLOSURE

An automatic release for nuclear reactor control rod actuating mechanism carried by a removable, nuclear vessel head. A reciprocable actuator telescope with a control rod extension and is releasably connected thereto by spring pressed transversely sliding latches in the actuator. Near the bottom of the actuator stroke stationary taper pins enter axially extending holes in the actuator and start to enter misaligned holes in the latches. At the bottom of the actuator stroke the taper pins having passed through the misaligned holes in the latches have automatically withdrawn the latches and disconnected the rod extension so that the head and actuator may be removed as a unit leaving the control rod in the reactor. Upward movement of the actuator from the bottom of its stroke with the head in place will move this actuator away from the taper pins and automatically release the latches and latch the actuator to the control rod.

BACKGROUND OF THE INVENTION

Figure 1:
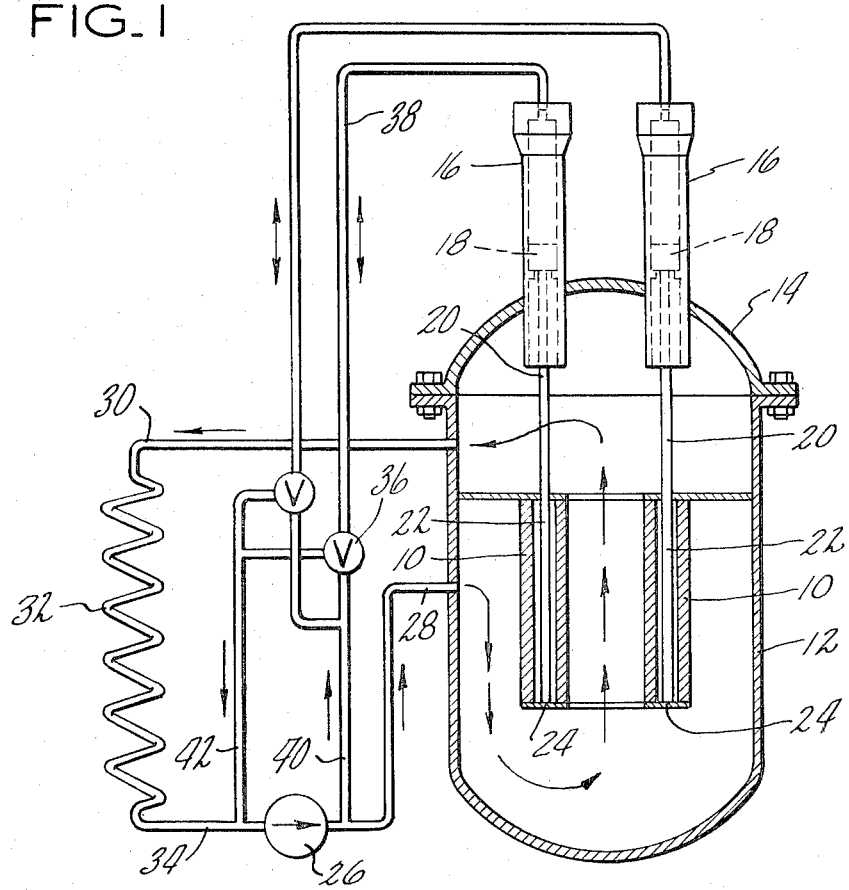

This invention relates to nuclear reactor control rod drive mechanism and particularly to mechanism for automatically connecting and disconnecting the control rod drive, or actuating, mechanism to the control rod or control rod extension. Such a mechanism facilitates assembly and disassembly of the drive mechanism and the control rod, including the removal and replacement of the nuclear vessel cover or head, even when submerged under several feet of water, while leaving the control rod in the nuclear reactor.

In refueling a nuclear reactor it is necessary to remove the reactor vessel head or cover which usually carries the actuator or drive mechanism while leaving the control rods in their fully inserted position in the reactor. This requires disconnecting the actuating mechanism from the control rod and upon reassembly again connecting the actuator to the control rod. As a safety precaution the surrounding area is usually flooded so that the connecting and disconnecting must be done under several feet of water.

In a nuclear reactor control rod drive mechanism it is time consuming to have to manually uncouple the drive mechanism from the control rod. A further disadvantage is that through human error it is possible to lift the reactor vessel head with one or more rods still coupled.

SUMMARY OF THE INVENTION

According to the present invention a removable reactor vessel head supports control mechanism including a guide member extending transversely therethrough and a vertically reciprocable nuclear control rod actuator in the guide member. A control rod or a control rod extension extends axially, in telescoped relation, into the actuator. An automatically actuated latch mechanism is provided for connecting the actuator with the control rod or control rod extension including latch releasing mechanism actuated by movement of the actuator and the control rod to their lowermost, or fully shut down, or scram, position.

The actuator, which is shown as a hydraulically actuated piston vertically reciprocable in a guide cylinder, carries transversely slidable latch members coacting with a shoulder on the control rod extension. A spring, preferably a flat spring in the embodiment shown, presses the latch member inwardly into latching engagement with the control rod extension.

Vertically upwardly extending stationary tapered pins are fixed in the guide member or cylinder adjacent the lower limit of actuator travel, which is determined by a stop member in the guide cylinder. The actuator is provided with axially extending holes in its lower surface aligned with the tapered pins. The latch members have axially extending holes therethrough which are aligned with the holes in the actuator when the latch members are in unlatched position and are in misaligned position when they have moved, by the springs, transversely of the actuator into latched position.

As the piston nears the lower limit of travel the pins enter the axially extending holes in the actuator and start to enter the misaligned holes in the latch members. With the actuator in this position the control rod has been brought to its lowermost or fully inserted position and can go no lower. Further descent of the actuator to its lower limit will move the actuator along the control rod extension and will force the latches along and over the taper pins with the taper on the pins acting on one side of the holes in the latch members, forcing the holes in the latches into alignment with the holes in the actuator and forcing the latches outwardly against the action of the springs and out of contact with the rod extension, thus automatically releasing the actuator from the control rods. The reactor vessel head with the guide member and the actuator supported therein at its lower limit may now be removed from the reactor vessel leaving the control rod fully inserted in the reactor.

An object of this invention is an improvement in drive mechanism for nuclear control rods.

A further object is an automatically actuated mechanism for connecting and disconnecting a control rod actuator and its associated control rod.

A further object is a device automatically releasing actuating or drive mechanism carried by a nuclear vessel head from its connection with a nuclear control rod so that the head may be removed without simultaneous removal of the control rod.

A still further object is means indicating that the actuator is in its lowermost position and additional mechanical means for forcing it to its lowermost position.

Figure 4:
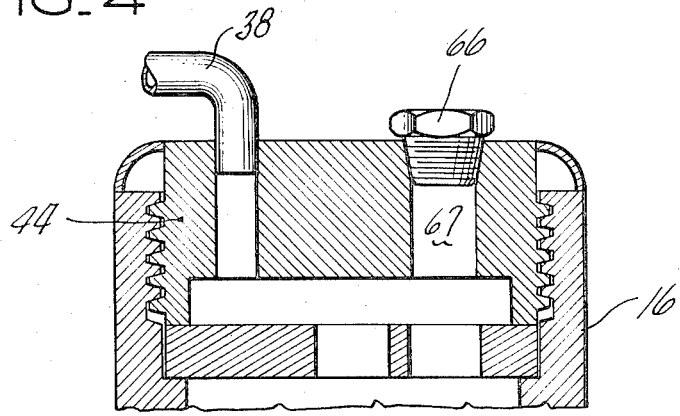

Other objects and advantages will be apparent from the following specification and the accompanying drawings in which:

FIG. 1 is a schematic drawing of a reactor and a hydraulically actuated drive mechanism;
FIG. 2 is a partial side elevation partly in section of the drive mechanism;
FIG. 3 is a top view of FIG. 2;
FIG. 4 is a partial side elevation showing the hydraulic connections to the drive or guide cylinder;
FIG. 5 is a partial split side view in section showing the piston in two different positions and latches in latched and unlatched position;
FIG. 6 is a sectional top view of FIG. 5.

DESCRIPTION OF THE PREFERRED EMBODIMENT

The now-preferred embodiment of this invention is disclosed in connection with hydraulically actuated drive or actuating mechanism for a nuclear control rod. The general operation of the hydraulic system is disclosed schematically in FIG. 1 in which the nuclear core 10 is shown immersed in a nuclear vessel 12 having a detachable head 14. The head 14 carries cylinders or guide members 16 permanently secured thereto. Actuators or drive members in the form of pistons 18 are mounted for reciprocating m movement in the cylinders 16. The pistons 18 are connected, by mechanism incorporating the present invention which will be described in detail later, to the control rod extenusions 20 which in turn are connected to the control rods 22 shown in FIG. 1 as fully immersed in the reactor core 10 and resting on stops 24 adjacent the bottom of the core 10. A circulating pump 26 forces water at a selected high pressure through a pipe 28 into the nuclear vessel 12, the pressurized water after passing through the core 10 emerges from the vessel through pipe 30 and after passing through the heat exchanger 32 reenters the pump 26 through inlet 34. The under side of the piston 18 is continuously subjected to the pressure in the upper portion of the nuclear vessel 12. The other or upper side of the piston may be subjected to the somewhat higher pressure at the outlet of the pump 26 or by means of the three-way valve 36 to the lower pressure at the inlet of the pump 26. When subjected to the higher pressure the piston 18 will be forced downwardly and when subjected to the lower pressure the piston 18 will be forced upwardly. The operation of the valve 36 may be controlled by any suitable means well known in the art and not shown. The valve 36 will selectively connect pipe 38 leading to the interior of cylinder 16 with either pipe 40 connected with the outlet of pump 26 or pipe 42 connected with the inlet of pump 26.

As shown in FIG. 2 the cylinder 16 which is welded to the head 14 has a closure member 44 threaded into its upper end and carries a scram solenoid 46 and a mechanical lock solenoid 48. A tube 50 passing through the piston 18 connects the area at the bottom of the piston with the area at the top of the piston and is closed by a valve 52 controlled by scram solenoid 46 to permit equalization of the pressure on both sides of the piston and allowing the piston and its associated control rod to drop quickly under the influence of gravity in the event of any emergency. A rod 54 having a spiral slot 56 therein which receives a pin carried by the piston 18 is rotatably mounted in the cylinder 16. Reciprocating movement of the piston 18 will cause the rod 54 to rotate. A plunger 60 controlled by solenoid 48 is spring pressed downward to enter slots 62 in the flange 64 forming part of rotatable rod 54 and when entered in the slot 64 will prevent rotation of the rod 54 and movement of the piston 18. A removable plug 66 plugs a passageway 67 in the closure member 44. Passageway 67 is adapted to receive a rod, not shown, which may be passed through the passageway 67 in closure member 44 and on to the upper portion of piston 18 to thereby locate the piston and apply force to force the piston 18 downward even to its lowermost position and against the stop 68 if necessary or desirable to assure that the piston is at its lowermost position.

As shown in FIG. 5, which is is a split view showing two positions of the piston 18 and a single position of the control rod extension 20, the piston 18 carries transversely slidable latch members 70 in transversely extending passageways 71. Although only two latches are shown, any desired number may be used. These latches are shown, any desired number may be used. These latch members, which are preferably round, are urged transversely inward in their passageways by means of a flat spring 72 mounted in a slot 73 in the piston 18. The inner ends of the latches 70 are provided with a transverse latching surface 74 and a slanting camming surface 76. Each latch is provided with a hole extending transversely therethrough and having a position aligned with hole 80 extending axially in the piston 18 when the latch is in the unlatched position shown in the right-hand portion of FIG. 5. The transverse hole is positioned in a misaligned position when the latch 78 is in latched position shown in the left-hand portion of FIG. 5.

The control rod 20 has a taper 82 at the upper end and a latch element cooperating with latches 70 and comprising a latching shoulder 84 formed directly below the taper portion. Directly below the latching shoulder is a camming surface 86. The taper portion 82 and the camming surface 86 coact with the camming surface 76 on the latches to force them outward as the control rod extension 20 moves into the piston 18 if the latches are not already held outward by other means. The control rod extension 20 is received in an axially extending blind hole 88 in the piston 18 and has an end surface 90 which may coact with the upper portion of control rod extension 20 to force it down if necessary. The upper surface 68 of an inwardly extending flange 92 in the cylinder 16 acts as a stop determining the lowermost position of the piston 18. The ring magnet 94 coacts with a reed switch 96 to indicate that the control rod is in its lowermost position. Taper pins 98 secured in the flange 92 in the cylinder 16 extend upwardly in the interior of cylinder 16 and in alignment with holes 80 in the piston. As the piston 18 is lowered toward its lowermost operating position the tapered portions 100 of the pins 98 start to enter the misaligned holes 78 in the latches 70 as shown in the left-hand portion of FIG. 5. Further downward movement of the piston 18 to the end of its stroke will force the latches 70 over the pins 98 and the camming surface 86 of extension 20 into contact with camming surface 76 of latches 70 and force the latches outward. The tapered portions 100 of the pins in passing through the holes 78 in the latches 70 will force the latches 70 outward against the action of the spring 72 to bring the holes 78 into alignment with the holes 80 and force the latches into the unlatched position and out of contact with extensions 20 as shown in the right-hand portion of FIG. 5. During this unlatching procedure the control rod extension remains in the fixed position shown as it is at the bottom of its stroke and prevented from further downward movement by the stops 24 in the core.

The accompanying drawings show a coupling device that is entirely automatic. It is shown as part of a hydraulic piston drive but the idea would be applicable to other drive methods such as magnetic jack, rack and pinion.

OPERATION

The piston 18 is free to move vertically in the pressure tube or cylinder 16 by means of pressure in the up direction and gravity, assisted by pressure if necessary or desirable, in the down direction.

During assembly the piston is lowered into the tube and due to gravity it moves downward. The head is off the reactor at this time. The rod latches move outwardly by action of the pins 98 projecting upward and exerting a pressure against the outward side of the latch actuating hole 78. The bar spring 72 pushes the latches inward, due to the steep angle on the actuating pins 98, the weight of the piston is more than adequate to force the latches outward, compressing the bar springs in the process.

With the latches withdrawn to the uncoupling position, lifting the reactor head, with pressure tubes attached, would maintain the latches in the withdrawn position due to the gravitational force on the piston. To further insure that the piston remains in place, the mechanical lock solenoid is de-energized and through spring pressure a pin 60 engages the helix shaft serrated disc. This prevents the helix shaft 54 from rotating and, by means of the helix shaft actuating pin 56 locks the piston in place.

Now the head can be placed on the reactor vessel and lowered into place, the angle on the control rod extension shaft guiding itself into the piston, resulting in a position as shown in FIG. 5, right-hand side.

To engage the rod to the drive the mechanical lock solenoid is energized, bringing the pin out of engagement with the helix shaft. Next the piston is driven upward, by any suitable means, hydraulic pressure in this example. After approximately ¼ inch upward movement the spring 72 forces the latch inward along the tapered section 100 of the actuating pin following the 15° angle 86 on the rod extension shaft until the top latch ledge 74 comes against the flat 84 on the rod extension 20. Any further piston movement upward will take the control rod with it.

For movement in the downward direction, normally the control rod extension shaft is exerting a downward force on the latches and piston and the piston "lowers" the rod. Should the rod become stuck in an intermediate position for any reason, by applying force to the piston downward, hydraulically or by other means, the 15° angle 86 on the control rod extension shaft cams out the latches in a manner similar to the unlatching pins. After the piston has moved downwardly approximately ⅞ inch, the piston blind hole end surface 90 comes into contact with the top of the control rod extension shaft forcing it downward with whatever force desired.

Once the rod becomes unstuck and starts to drop by gravity, the latches would be forced by the springs along the contour 86 of the extension shafts and relatch the rod automatically.

Should one of the latches become inoperative for any reason the remaining latch or latches are capable of safely moving the entire load.

While we have illustrated and described a preferred embodiment of our invention it is to be understood that such is merely illustrative and not restrictive and that variations and modifications may be made therein without departing from the spirit and scope of the invention. We therefore do not wish to be limited to the precise details set forth but desire to avail ourselves of such changes as fall within the purview of our invention.

What is claimed is:

1. In combination a removable head for a nuclear reactor vessel, an elongated axially reciprocable actuating member, a support for said member carried by said head, connecting mechanism carried by said actuating member and mechanically held connected for releasably connecting said member to a control rod and disabling means for disabling said connecting mechanism, said disabling means having two coacting portions, one portion fixed relative to said head and a second portion reciprocably movable with said actuating member into coacting relation with said one portion to activate said disabling means to disable said connecting mechanism and release said control rod incident to movement of said member to a predetermined reciprocable position with respect to said head.

2. A combination as claimed in claim 1 including means carried by said support holding said member in said position and said connecting mechanism disabled during removal of said head.

3. A combination as claimed in claim 1 in which said member is a piston, said support is a cylinder surrounding said piston, and said mechanism includes latch structure carried by said member.

4. A combination as claimed in claim 3 in which said one portion of said disabling means include axially extending tapered pins coacting with axially extending passageways in said piston and said latch structure with the wall of the passageway in said latch structure comprising said second portion.

5. A combination as claimed in claim 1 in which said mechanism comprises latch members spring pressed into latching relation transversely of the path of travel of said member and said one portion of said disabling means are axially extending tapered pins coacting with axially extending passageways in said members and in said latch members.

6. In combination with a nuclear reactor vessel having a removable head, an axially reciprocable nuclear control rod positioned in said vessel, control rod driving means carried by said head and including, an axially reciprocable driving member and a guide for said member fixed with respect to said head, a latch connecting said member and said rod and a latch release for releasing said member from said rod, said latch release comprising two cooperating parts, one part fixed on said guide and a second part reciprocable with the driving member and movable thereby into cooperating relation with said one part to activate said latch release and release said member from said rod by movement of said driving member to a predetermined position with respect to said guide.

7. A combination as claimed in claim 6 in which said guide is a vertically extending cylinder and the driving member is a piston in said cylinder and the latch includes a latch member slidable in and transversely of said piston and a coacting catch on said rod.

8. A combination as claimed in claim 6 including means locking said member in said position and holding said latch in released position in which said member is released from said rod so that said head, guide and driving means can be removed as a unit, leaving said control rod in said vessel.

9. A combination as claimed in claim 6 in which said member has an axially extending passageway and said latch has an axially extending passageway therethrough aligned with said member passageway in unlatched position but misaligned therewith in latched position and said one part of said latch release includes a tapered pin carried by said guide extending vertically in alignment with said piston passageway and adapted to force said passageways into alignment.

10. A combination as claimed in claim 7 including a passageway through said head in line with said cylinder adapted to receive a rod for locating and applying a downward force to said piston.

11. A combination as claimed in claim 7 in which said control rod is vertically reciprocable and is movable downward by gravity to a stopped position determined by stop means limiting downward movement of said control rod, means for moving said piston downward, with respect to said stopped control rod, to said predetermined position and actuating said latch release.

12. In combination with a removable head for a nuclear reactor vessel and a control rod vertically reciprocable in said vessel, a vertically reciprocable actuator for reciprocating said rod, vertically extending guide means for said actuator secured to said head and adapted to guide said actuator in alignment with said rod, latch means, carried by said actuator and a catch on said rod cooperating with said latch means to drivingly connect said actuator and rod, stop means limiting downward movement of said rod, said driving means adapted to force said actuator downward relative to the rod after it has been stopped by said stop means to a lowermost position and latch release means including a first portion secured to said guide means and a second portion reciprocable with the actuator and positioned to be moved into coacting relation with said first portion to withdraw said latch means from said catch and disconnect said actuator from said rod when said actuator is moved to said lowermost position.

References Cited

UNITED STATES PATENTS

| 3,494,827 | 2/1970 | Zinn | 176—36 |
| 3,486,974 | 12/1969 | Bertone | 176—36 |
| 3,377,252 | 4/1968 | Knights | 176—36 |

FOREIGN PATENTS

| 987,880 | 3/1965 | Great Britain | 176—36 |

HARVEY E. BEHREND, Primary Examiner

U.S. Cl. X.R.

176—36 R, 87; 294—86.31

PO-1050
(5/69)

UNITED STATES PATENT OFFICE
CERTIFICATE OF CORRECTION

Patent No. 3,788,943          Dated January 29, 1974

Inventor(s) Angelo J. Misenti  and  Gennaro V. Notari

It is certified that error appears in the above-identified patent and that said Letters Patent are hereby corrected as shown below:

Column 1, line 14, change "telescope" to --telescopes--.

Column 3, line 3, after "reciprocating" delete --m--;
line 6, change "extenusions" to --extensions--;
line 55, after "is" delete --is--;
line 60, after "used." delete --These latches are shown, any desired number may be used--;
line 67, after "hole" insert --or passageway--;
line 69, after "hole" insert --or passageway--;
line 72, change "78" to --70--.

Column 4, line 65, change "56" to --58--.

Column 6, line 32, change "said head in line with" to --the upper end of--.

Signed and sealed this 29th day of October 1974.

(SEAL)
Attest:

McCOY M. GIBSON JR.
Attesting Officer

C. MARSHALL DANN
Commissioner of Patents